United States Patent
Ferber (10) Patent No.: US 10,422,898 B2
(45) Date of Patent: Sep. 24, 2019

(54) SEISMIC DATA PROCESSING (71) Applicant: WESTERNGECO L.L.C., Houston, TX (US)

(72) Inventor: Ralf Ferber, West Sussex (GB)

(73) Assignee: WESTERNGECO L.L.C., Houston, TX (US)

( * ) Notice: Subject to any disclaimer, the term of this patent is extended or adjusted under 35 U.S.C. 154(b) by 647 days.

(21) Appl. No.: 14/605,641

(22) Filed: Jan. 26, 2015

(65) Prior Publication Data

US 2016/0084975 A1 Mar. 24, 2016

Related U.S. Application Data (60) Provisional application No. 62/053,941, filed on Sep. 23, 2014.

(51) Int. Cl.
- *G01V 1/30* (2006.01)
- *G01V 1/28* (2006.01)
- *G01V 1/38* (2006.01)

(52) U.S. Cl.
CPC .................. *G01V 1/28* (2013.01); *G01V 1/38* (2013.01); *G01V 2210/32* (2013.01); *G01V 2210/56* (2013.01); *G01V 2210/57* (2013.01); *G01V 2210/614* (2013.01)

(58) Field of Classification Search
CPC . G01V 1/303; G01V 1/38; G01V 1/28; G01V 2210/60; G01V 2210/56; G01V 2210/614; G01V 2210/57
USPC .......................................................... 702/18
See application file for complete search history.

(56) References Cited

U.S. PATENT DOCUMENTS

| 5,850,622 A | 12/1998 | Vassiliou et al. |
| 6,704,244 B1 | 3/2004 | Vaage |
| 7,817,495 B2 | 10/2010 | Ozbek et al. |

(Continued)

FOREIGN PATENT DOCUMENTS

WO 2012048175 A2 4/2012

OTHER PUBLICATIONS

International Search Report issued in related PCT application PCT/US2015/051122 dated Nov. 26, 2015, 3 pages.
Written Opinion issued in related PCT application PCT/US2015/051122 dated Nov. 26, 2015, 12 pages.
Mallat, Matching Pursuits with Time-Frequency Dictionaries, IEEE, Dec. 1993, vol. 41, No. 12.

(Continued)

*Primary Examiner* — Sujoy K Kundu
*Assistant Examiner* — Lynda Dinh
(74) *Attorney, Agent, or Firm* — Michael Guthrie (57) ABSTRACT

Described herein are implementations of various technologies for a method for seismic data processing. The method may receive seismic data for a region of interest. The seismic data may be acquired in a seismic survey. The method may receive a summation that is based on a particle motion velocity component of a seismic wavefield in the vertical direction and the pressure component of the seismic wavefield. The method may predict an upgoing pressure component of the seismic wavefield for the region of interest. The method may compare the predicted upgoing pressure component to the received seismic data that corresponds to the received summation. The method may update the predicted upgoing pressure component based on the comparison. The method may use the updated upgoing pressure component in hydrocarbon exploration or production for the region of interest.

16 Claims, 4 Drawing Sheets

(56) References Cited

U.S. PATENT DOCUMENTS

| | | | |
|---|---|---|---|
| 8,767,505 | B2 | 7/2014 | Welker |
| 2005/0117451 | A1 | 6/2005 | Robertsson |
| 2007/0219765 | A1 | 9/2007 | Calvert et al. |
| 2008/0186804 | A1 | 8/2008 | Amundsen et al. |
| 2008/0253227 | A1 | 10/2008 | Sollner |
| 2008/0312878 | A1 | 12/2008 | Robertsson et al. |
| 2009/0067285 | A1 | 3/2009 | Robertsson et al. |
| 2010/0211319 | A1* | 8/2010 | van Manen ............ G01V 1/364 702/14 |
| 2011/0292762 | A1* | 12/2011 | Ozdemir .............. G01V 1/3808 367/24 |
| 2012/0082001 | A1 | 4/2012 | Welker et al. |
| 2012/0089337 | A1 | 4/2012 | Vassallo et al. |
| 2013/0128696 | A1 | 5/2013 | Vassallo et al. |
| 2014/0050049 | A1* | 2/2014 | Kitchenside ............ G01V 1/36 367/24 |
| 2014/0200816 | A1 | 7/2014 | Peng et al. |

OTHER PUBLICATIONS

Ozbek et al., "Crossline wavefield reconstruction from multicomponent streamer data: Part 2—Joint interpolation and 3D up/down separation by generalized pursuit", Geophysics vol. 75, No. 6, Nov.-Dec. 2010, pp. WB69-WB85.

International Preliminary Report on Patentability for the equivalent International patent application PCT/US2015/051122 dated Apr. 6, 2017.

Caprioli, et al, "Combination of Multi-component Streamer Pressure and Vertical Particle Velocity—Theory and Application to Data," Jun. 7, 2012, retrieved at https://www.slb.com/~/media/Files/technical_papers/eage/eage2012a033.pdf on Nov. 24, '15.

Kamil, et al., "Bayesian deghosting approach for multimeasurement streamer data," SEG Technical Program Expanded Abstracts 2014, Aug. 5, 2014, pp. 4233-4237.

Extended Search Report for the equivalent European patent application 15844586.6 dated Sep. 11, 2018.

* cited by examiner

SEISMIC DATA PROCESSING

CROSS-REFERENCE TO RELATED APPLICATIONS

This application claims benefit of U.S. provisional patent application Ser. No. 62/053,941, entitled A JOINT INTERPOLATION AND DEGHOSTING METHOD FOR USE IN A SEISMIC STREAMER filed Sep. 23, 2014, which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth along curved paths and refract and partially reflect off subsurface seismic reflectors (e.g., interfaces between subsurface layers). These propagating signals are recorded by sensors (e.g., geophones located in seismic data recording units) laid out in a seismic spread covering a region of the earth's surface. The recorded signals may then be processed to yield a seismic survey.

SUMMARY

In some implementations, a method for seismic data processing is provided. The method may receive seismic data for a region of interest. The seismic data may be acquired in a seismic survey. The method may receive a summation that is based on a particle motion velocity component of a seismic wavefield in the vertical direction and the pressure component of the seismic wavefield. The method may predict an upgoing pressure component of the seismic wavefield for the region of interest. The method may compare the predicted upgoing pressure component to the received seismic data that corresponds to the received summation. The method may update the predicted upgoing pressure component based on the comparison. The method may use the updated upgoing pressure component in hydrocarbon exploration or production for the region of interest.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of the invention. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various techniques described herein are directed to jointly interpolating and deghosting seismic data. The section titled Seismic Acquisition describes methods and systems for acquiring seismic data for a region of interest. The section titled Using a Generalized Matching Pursuit Technique describes an interpolation process that may be used for the purpose of constructing a 3D representation of the acquired seismic data, where the interpolation process includes using a generalized matching pursuit (GMP) technique on acquired multi-component seismic data, as described in commonly assigned U.S. patent application Ser. No. 12/131,870 entitled JOINTLY INTERPOLATING AND DEGHOSTING SEISMIC DATA, now issued U.S. Pat. No. 7,817,495, which is incorporated herein by reference and described herein. The section titled Using a Modified Generalized Matching Pursuit Technique describes a method based on a modified generalized matching pursuit technique for jointly interpolating and deghosting seismic data.

Seismic Acquisition

Figure 1:
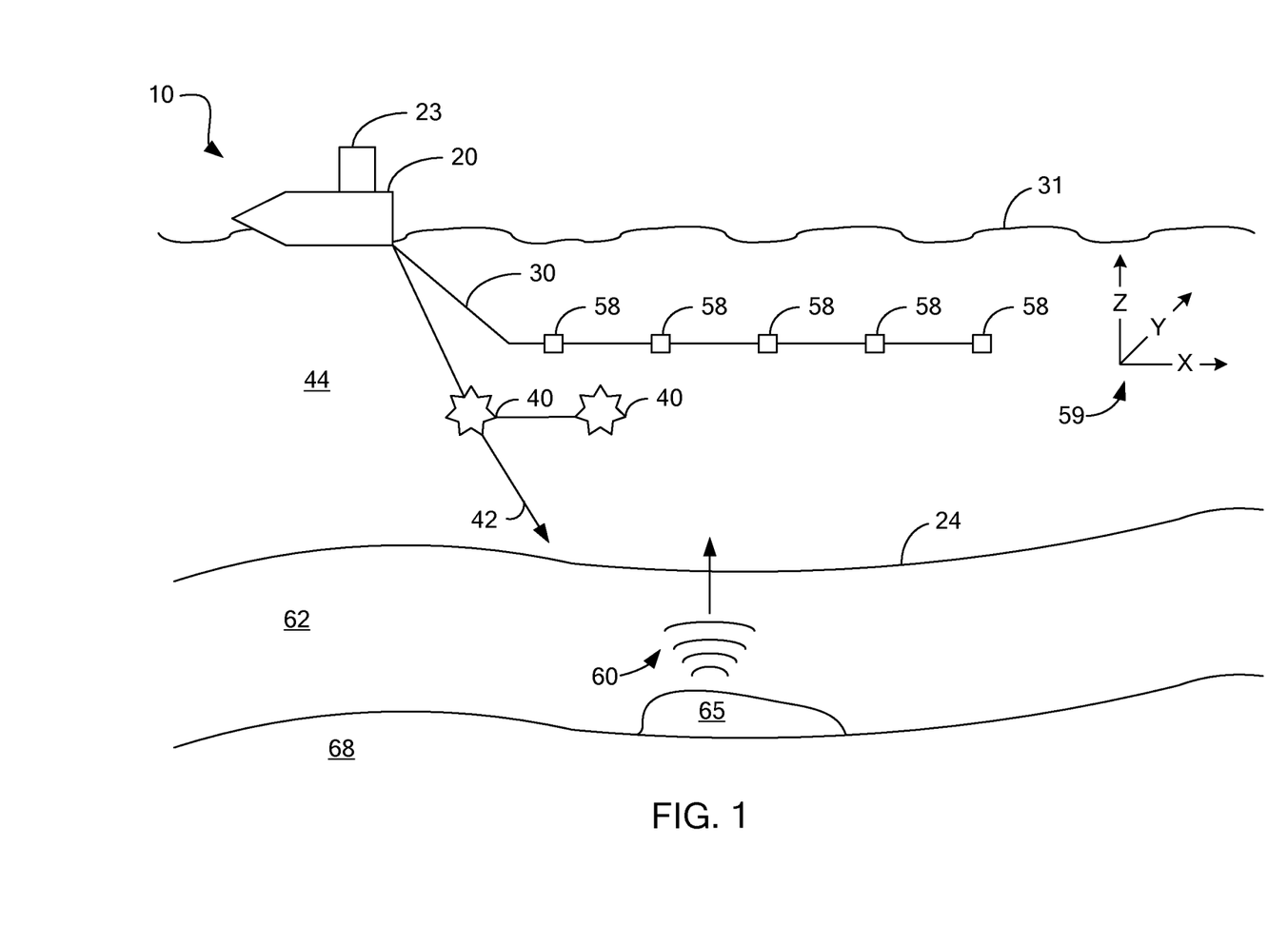
FIG. 1 illustrates a diagrammatic view of a land seismic acquisition system in accordance with various implementations described herein.

FIG. 1 illustrates a schematic diagram of a marine-based seismic acquisition system 10 in accordance with implementations of various techniques described herein. In system 10, survey vessel 20 tows one or more seismic streamers 30 (one streamer 30 being depicted in FIG. 1) behind the vessel 20. In one implementation, streamers 30 may be arranged in a spread in which multiple streamers 30 are towed in approximately the same plane at the same depth. Although various techniques are described herein with reference to a marine-based seismic acquisition system shown in FIG. 1, it should be understood that other marine-based seismic acquisition system configurations may also be used. For instance, the streamers may be towed at multiple planes and/or multiple depths, such as in an over/under configuration. In one implementation, the streamers may be towed in a slanted configuration, where fronts of the streamers are towed shallower than tail ends of the streamers.

Seismic streamers 30 may be several thousand meters long and may contain various support cables, as well as wiring and/or circuitry that may be used to facilitate communication along the streamers 30. In general, each streamer 30 may include a primary cable where seismic sensors 58 that record seismic signals may be mounted. In one implementation, seismic sensors 58 may include hydrophones that acquire pressure data. In another implementation, seismic sensors 58 may include multi-component sensors such that each sensor is capable of detecting a pressure wavefield and at least one component of a particle motion that is associated with acoustic signals that are proximate to the sensor. Examples of particle motions include one or more components of a particle displacement, one or more components (i.e., inline (x), crossline (y) and vertical (z) components (see axes 59)) of a particle velocity and one or more components of a particle acceleration.

Depending on the particular survey need, the multi-component seismic sensor may include one or more hydrophones, geophones, particle displacement sensors, particle velocity sensors, accelerometers, pressure gradient sensors, or combinations thereof. In one implementation, the multi-component seismic sensor may be implemented as a single device, as depicted in FIG. 1, or may be implemented as a plurality of devices. In another implementation, a particular multi-component seismic sensor may also include pressure gradient sensors, which constitute another type of particle motion sensors. A pressure gradient sensor may measure the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

Marine-based seismic data acquisition system 10 may also include one or more seismic sources 40, such as air guns and the like. In one implementation, seismic sources 40 may be coupled to, or towed by, the survey vessel 20. The seismic sources 40 may operate independently of the survey vessel 20 in that the sources 40 may be coupled to other vessels or buoys.

As seismic streamers 30 are towed behind the survey vessel 20, acoustic signals 42, often referred to as "shots," may be produced by seismic sources 40 and are directed down through a water column 44 into strata 62 and 68 beneath a water bottom surface 24. Acoustic signals 42 may be reflected from the various subterranean geological formations, such as formation 65 depicted in FIG. 1.

The incident acoustic signals 42 that are generated by the sources 40 produce corresponding reflected acoustic signals, or pressure waves 60, which may be sensed by seismic sensors 58. In one implementation, pressure waves received and sensed by seismic sensors 58 may include "up going" pressure waves that propagate to the sensors 58 without reflection, as well as "down going" pressure waves that are produced by reflections of the pressure waves 60 from air-water boundary 31.

Seismic sensors 58 generate signals, called "traces," which indicate the acquired measurements of the pressure wavefield and particle motion. The traces (i.e., seismic data) may be recorded and may be processed by signal processing unit 23 deployed on the survey vessel 20.

The goal of the seismic acquisition is to generate an image of a survey area for purposes of identifying subterranean geological formations, such as the geological formation 65. Subsequent analysis of the image may reveal probable locations of hydrocarbon deposits in subterranean geological formations. In one implementation, portions of the analysis of the image may be performed on the seismic survey vessel 20, such as by the signal processing unit 23.

A particular seismic source 40 may be part of an array of seismic source elements (such as air guns, for example) that may be arranged in strings (gun strings, for example) of the array. Regardless of the particular composition of the seismic sources, the sources may be fired in a particular time sequence during the survey. Although FIG. 1 illustrates a marine-based seismic acquisition system, the marine-based seismic acquisition system is provided as an example of a seismic acquisition system that may correspond to the methods described herein. However, it should be noted that the methods described herein may also be performed on a land-based seismic acquisition system, a seabed-based seismic acquisition system, or a transition zone-based seismic acquisition system.

The seismic sensors 58 may also receive noise generated by one or more sources not illustrated in FIG. 1. Seismic sources coupled to competitor survey vessels, operating near or in an area of interest for survey vessel 20, may generate seismic interference signals. The seismic interference signals may be sensed by the seismic sensors 58, leading to seismic data containing measurements for both the seismic interference signals and the reflected acoustic signals from sources 40. Removal of the seismic interference signals from the seismic data may allow for more accurate imaging of a survey area for the identification of subterranean geological formations, such as the geological formation 65.

Sometimes, the seismic interference signals may reach the seismic sensors 58 from one or more directions. As an example, the seismic interference signals may reach the seismic sensors 58 from a direction that is different with respect to the reflected acoustic signals from sources 40. Other times, seismic sensors may receive noise associated with ships, rigs, the environment, or combinations thereof.

Down going pressure waves create an interference known as "ghosts". Depending on the incidence angle of the up going wavefield and the depth of the streamer 30 as shown in FIG. 1, the interference between the up going and down going wavefields creates nulls, or notches, in the recorded spectrum. These notches may reduce the useful bandwidth of the spectrum and may limit the possibility of towing the streamers 30 in relatively deep water (water depth greater than 20 meters (m), for example).

The technique of decomposing the recorded wavefield into upgoing and downgoing components is often referred to as wavefield separation, or "deghosting." The particle motion data that are provided by the multi-component seismic sensors 58 allows the recovery of "ghost" free data, which means data that are indicative of the upgoing wavefield.

Using a Modified Generalized Matching Pursuit Technique

Figure 2:
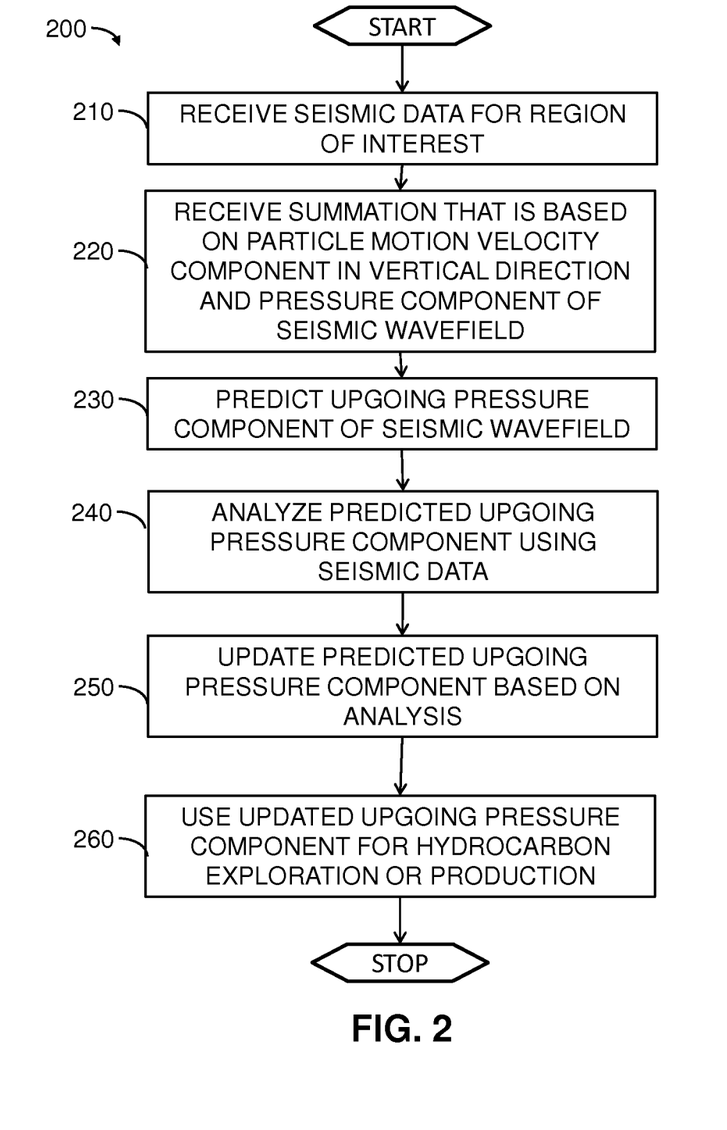
FIG. 2 illustrates a flow diagram of a method for processing seismic data in accordance with various implementations described herein.

FIG. 2 illustrates a flow diagram of a method for processing seismic data in accordance with various implementations described herein. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted. FIG. 2 may be described with reference to FIG. 3.

At block 210, acquired seismic data may be received for a region of interest (i.e., "the received seismic data"). For instance, the acquired seismic data may correspond to a seismic survey as described in FIG. 1. The acquired seismic data may include pressure data and multi-component data, such as particle motion data (also called velocity data) for one, two or three spatial axes. For instance, the multi-component data may describe the particle motion velocity of a seismic wavefield in the vertical direction (i.e., z-axis) or cross-line direction (i.e., y-axis) recorded by sensors on a streamer. The region of interest may include an area of the earth's subsurface that may be of particular interest, such as for hydrocarbon production.

At block 220, a summation may be determined (i.e., "the summation") for components of a seismic wavefield. For instance, the summation may be a mathematical expression that is based at least in part on the particle motion velocity component of a seismic wavefield in the vertical direction and the pressure component of the seismic wavefield. In a Generalized Matching Pursuit (GMP) algorithm, components of a seismic wavefield may be separated into a pressure component, a particle motion velocity component in the vertical direction, and a particle motion velocity component in the crossline direction. Using the summation in the GMP algorithm may reduce the dimensionality of the GMP algorithm from 3 to 2. As such, the summation may provide a standard for evaluating one or more predictions of an upgoing pressure component of the seismic wavefield with respect to actual seismic data.

In one implementation, the summation may be based on a particle motion velocity component of a seismic wavefield in a direction different from the vertical direction, e.g., the crossline direction or a direction between the crossline direction or the vertical direction.

In another implementation, the summation may include one or more weights that are directed toward the particle motion velocity component and/or the pressure component of the seismic wavefield. For instance, the summation may be described by the following equation:

$$\text{Summation} = w_p(f)P(f,k_x,k_y) + w_z(f)V_z(f,k_x,k_y) \quad \text{Equation 1}$$

where $P(f,k_x,k_y)$ is the pressure component of a seismic wavefield, $V_z(f,k_x,k_y)$ is the particle motion velocity component in the vertical direction of the seismic wavefield, $w_p(f)$ is a weight for the pressure component of the seismic wavefield, $w_z(f)$ is a weight for the particle motion velocity component in the vertical direction of the seismic wavefield, f is the frequency of the seismic wavefield, $k_x$ is an inline wavenumber of the seismic wavefield and $k_y$ is a crossline wavenumber of the seismic wavefield.

In another implementation, a weight (e.g., $w_p(f)$ or $w_z(f)$) may be selected based on the inverse of noise found in the received seismic data. For instance, if the measured data regarding the pressure component has poor signal to noise ratio while the measured data for the particle motion velocity component in the crossline direction has a better signal to noise ratio, a weighted summation may be used that deemphasizes the pressure component and emphasizes the particle motion velocity component in the crossline direction. As such, weights may be used to increase the reliance in the weighted summation given to the particle motion velocity component, while decreasing the reliance in the weighted summation given to the pressure component. If the particle motion velocity component and the pressure component have approximately the same signal to noise ratio, the weighted summation may include weights that are substantially equal (e.g., $w_p(f)=\frac{1}{2}$ and $w_z(f)=\frac{1}{2}$). In another implementation, the sum of the weights may be unity or approximately equal to one.

Blocks 230-250 describe a Generalized Matching Pursuit (GMP) technique used in connection with the summation. For more information regarding GMP techniques, see the section titled Using a Generalized Matching Pursuit Technique and FIG. 3 below.

At block 230, an upgoing pressure component of a seismic wavefield may be predicted (i.e., "the predicted upgoing pressure component"). For instance, the predicted upgoing pressure component may be modelled as one or more basis functions. A basis function may be a sinusoidal function with one or more parameters, such as amplitude, phase, frequency, a wavenumber in the cross-line direction, a wavenumber in the inline direction, and a wavenumber in the vertical direction. For more information regarding basis functions, see block 310 and the accompanying description from the section titled "Using a Generalized Matching Pursuit Technique" below.

At block 240, the predicted upgoing pressure component from block 230 may be analyzed using the received seismic data and the summation. For instance, a two-component measurement vector based on the summation may be determined. The two-component measurement vector may be expressed in the time-space domain by the following equation:

$$m(t,x,y,Z) = [(w_p * P(t,x,y,Z) + w_z * V_z(t,x,y,Z))V_y(t,x,y,Z)]^T \quad \text{Equation 2}$$

where x is the location in the inline direction, y is the location in the crossline direction, Z is the location in the vertical direction or a streamer depth, t is the recorded time of the recorded seismic data, P is the measured pressure component, $V_z$ is the measured particle motion velocity component in the vertical direction, $V_y$ is the measured particle motion velocity component in the crossline direction, $w_p$ is the weight for the pressure component, and $w_z$ is the weight for the particle motion velocity component in the vertical direction. Further, data processing may be performed in the corresponding frequency-wavenumber domain. As such, Equation 2 may be expressed as the following equation:

$$\overset{p}{m}(f,k_x,k_y,Z) = [(w_p(f)P(f,k_x,k_y,Z)+w_z(f)V_z(f,k_x,k_y,Z))V_y(f,k_x,k_y,Z)]^T \quad \text{Equation 3}$$

where f is a frequency of the seismic wavefield, $k_x$ is an inline wavenumber of the seismic wavefield, and $k_y$ is a crossline wavenumber of the seismic wavefield. Further, a two-component ghosting operator, i.e., a filter operator that includes ghost operators directed to the pressure component and particle motion velocity component in the vertical direction, may be determined for the two-component measurement vector. For instance, the two-component ghosting operator may be expressed by the following equation:

$$\overset{p}{H}(f, k_x, k_y, Z) = \left[\left(w_p(f)(1-\xi e^{i2k_zZ}) + w_z(f)\frac{k_z}{2\pi f}(1+\xi e^{i2k_zZ})\frac{ck_y}{2\pi f}(1+\xi e^{i2k_zZ})\right)\right]^T \quad \text{Equation 4}$$

The two-component ghosting operator may include ghost operators directed to the pressure component P and the particle motion velocity component in the vertical direction $V_y$. As such, the two-component ghosting operator may be expressed by the following equation:

$$\overset{p}{H}(f, k_x, k_y, Z) = \left[\left(w_p(f)(1-\xi e^{i2k_zZ}) + w_z(f)\frac{k_z}{2\pi f}(1+\xi e^{i2k_zZ})\frac{ck_y}{2\pi f}(1+\xi e^{i2k_zZ})\right)\right]^T \quad \text{Equation 5}$$

where $k_z$ is the vertical wavenumber, $\xi$ is the sea-surface reflection coefficients (e.g., a number close to −1), and Z is the streamer depth.

Using Equations 2, 3 and 4, the two-component measurement vector may be related to the upgoing pressure wave data. For instance, the two-component measurement vector may be expressed by the following equations:

$$\overset{p}{m}(f,k_x,k_y,Z) = \overset{p}{H}(f,k_x,k_y,Z)P_{up}(f,k_x,k_y,Z) \quad \text{Equation 6}$$

Further, the summation may be used to analyze the predicted upgoing pressure component by comparing the received seismic data that corresponds to the summation with derived data based on a predicted upgoing pressure component (e.g., based on Equation 6).

Figure 3:
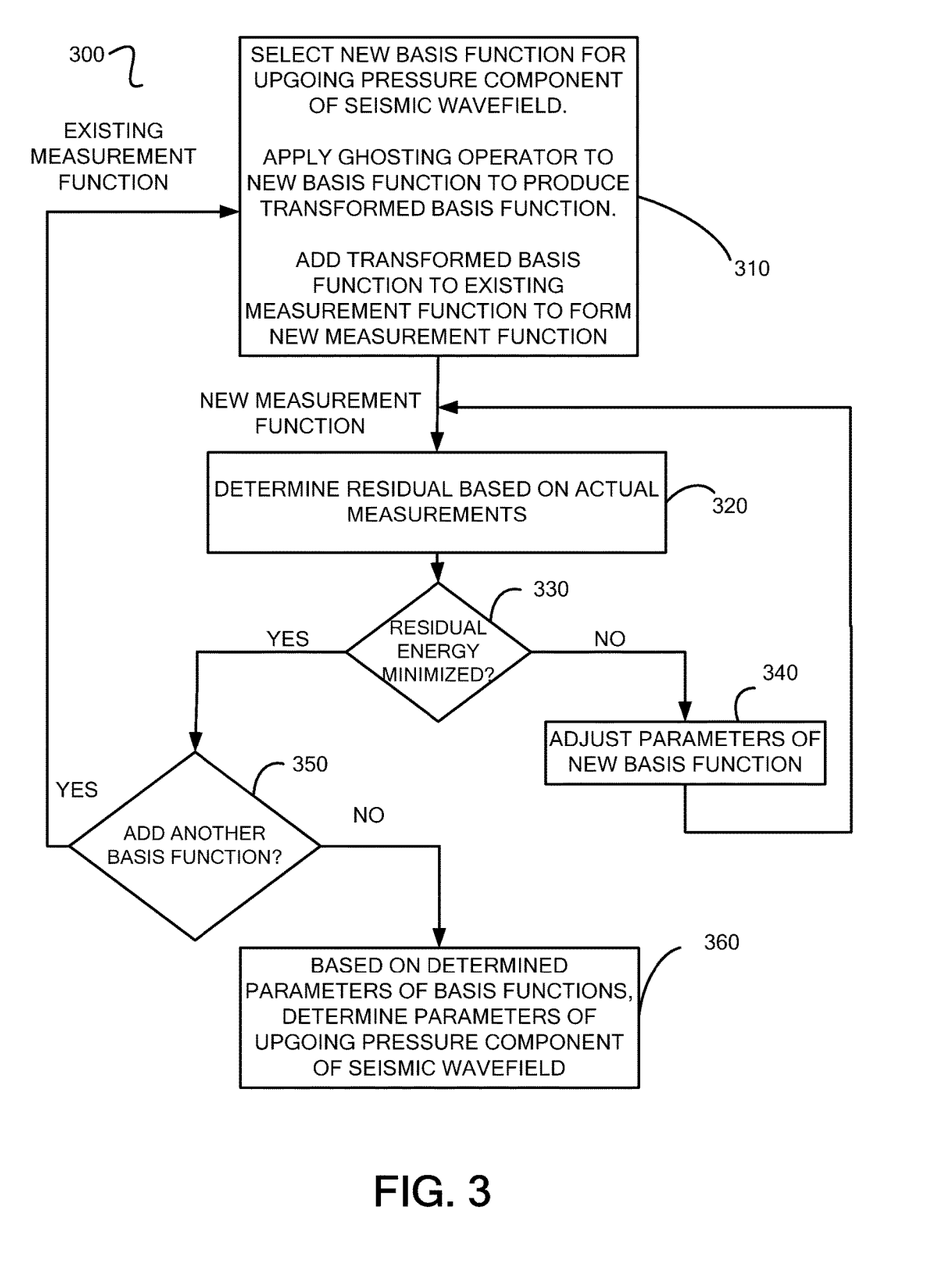
FIG. 3 illustrates a flow diagram of a method for using a generalized matching pursuit technique in accordance with various implementations described herein.

As such, the analysis at block 240 may include comparing data for the two-component measurement vector with measurements obtained from the received seismic data that correspond to the summation. For instance, pressure measurements and measurements of the particle motion velocity component in the vertical direction may be applied to the summation (e.g., Equation 1) to calculate a computed value. As such, a residual may be determined by the difference between derived data based on the predicted upgoing pressure component and actual measurements for the pressure component and the particle motion velocity component in the crossline direction. For more information regarding determining the residual, see block 320 and the accompanying description below.

Furthermore, at block 240, the predicted upgoing pressure component may be compared to the particle motion velocity component of the seismic wavefield in the cross-line direction, as measured by the received seismic data. For instance, derived data based on the predicted upgoing pressure component may be compared with measurements from the received data that correspond to the particle motion velocity component in the cross-line direction. Accordingly, a residual may also be determined based on the difference.

At block 250, the predicted upgoing pressure component may be updated based on the analysis at block 240. For instance, using a residual obtained at block 240, the parameters of the predicted upgoing pressure component may be updated iteratively until a predetermined criterion is satisfied. In one implementation, the predetermined criterion may be whether the energy of the residual has been minimized as described by block 330 below. In another implementation, the predetermined criterion may be whether the residual has converged approximately to a minimum. In yet another implementation, after the residual for a basis function has satisfied the predetermined criterion, a new basis function maybe obtained for the predicted upgoing pressure component at block 230. As such, a resulting upgoing pressure component from block 250 may be a linear combination of a plurality of basis functions that match approximately with the received seismic data. For more information regarding updating the upgoing pressure component through updating one or more basis functions, see FIG. 3 and the accompanying description below.

If the predetermined criterion is not satisfied, method 200 may return to block 230 using an updated upgoing pressure component in place of the predicted upgoing pressure component. If a respective basis function fails to satisfy the predetermined criterion, method 200 may return to block 230 where one or more parameters of the respective basis function are updated.

At block 260, the updated upgoing pressure component may be used for hydrocarbon exploration or production for the region of interest. For instance, the upgoing pressure component may be used to produce a velocity model or reflection model for the region of interest. The velocity model or the reflection model may be used to determine the presence of hydrocarbons in the region of interest.

Using a Generalized Matching Pursuit Technique

Various techniques and systems are described herein that jointly interpolate and deghost acquired seismic data. More specifically, based on the measurements that are acquired by the multi-component sensors, an upgoing component of the pressure wavefield (herein called "$p_u(x,y; z_s,f)$") component is determined at the seismic sensor locations, as well as at locations other than the sensor locations, without first interpolating the acquired seismic data and then deghosting the interpolated data (or vice versa).

The upgoing pressure wave component $p_u(x,y; z_s,f)$ at a temporal frequency f and cable depth $z_s$ may, in general, be modeled as a continuous signal as the sum of J sinusoids that have complex amplitudes (called "$A_j$"), as set forth below:

$$p_u(x, y; z_s, f) = \sum_{j=1}^{J} A_j e^{j2\pi(k_{x,j}x + k_{y,j}y + k_{z,j}z_s)} \quad \text{Equation 4}$$

In Equation 4, "$k_{x,j}$" represents the inline wavenumber for index j; "$k_{y,j}$" represents the crossline wavenumber for index j; "$z_s$" represents the streamer tow depth; "f" represents the temporal frequency of the sinusoids; and "c" represents the acoustic velocity in water. Additionally, "$k_{z,j}$," the wavenumber in the vertical, or depth, direction may be described as follows:

$$k_{z,j} = f/c\sqrt{1 - c^2(k_{x,j}^2 + k_{y,j}^2)/f^2} \quad \text{Equation 5}$$

Based on the representation of the upgoing pressure component $p_u(x,y; z_s, f)$ in Equation 6, the pressure and particle motion measurements may be represented as continuous signals described below:

$$m^P(x, y; z_s, f) = \sum_{j=1}^{P} A_j H(k_{x,j}, k_{y,j}; z_s, f) e^{j2\pi(k_{x,j}x + k_{y,j}y + k_{z,j}z_s)} \quad \text{Equation 6}$$

where "$m^P(x,y; z_s, f)$" represents a measurement vector, which includes the pressure and orthogonal components of the particle velocity in the inline, crossline and vertical coordinates, respectively. Thus, the measurements of the vector $m^P(x,y; z_s, f)$ are contiguous. In one implementation, any subset of $k_{x,j}$, $k_{y,j}$, $z_s$, and f may be used as input. In another implementation, any subset of $k_{x,j}$, $k_{y,j}$, $z_s$, and f may be used as models.

The measurement vector $m^P(x,y; z_s, f)$ may be described as follows:

$$m^P(x,y;z_s,f) = [p^P(x,y;z_s,f) v_x^P(x,y;z_s,f) v_y^P(x,y;z_s,f) v_z^P(x,y;z_s,f)]^T \quad \text{Equation 7}$$

where "$H(k_x,k_y; z_s,f)$" represents a ghosting operator, which is defined as follows:

$$H(k_x, k_y; z_s, f) = \quad \text{Equation 8}$$

$$\left[(1 + \xi e^{j4\pi k_z z_s}) \frac{ck_x}{f} (1 + \xi e^{j4\pi k_z z_s}) \frac{ck_y}{f} (1 + \xi e^{j4\pi k_z z_s}) \frac{ck_z}{f} (1 + \xi e^{j4\pi k_z z_s})\right]^T$$

In Equation 8, "$z_s$" represents the streamer depth; and represents the reflection coefficient of the sea surface.

Due to the relationships set forth in Equations 4 and 6, the $A_j$ parameters may be determined for purposes of jointly interpolating the acquired seismic data and determining the upgoing pressure component $p_u(x,y; z_s, f)$.

Equations 4 and 6 define the upgoing pressure component $p_u(x,y; z_s, f)$ and measurement vector $m^P(x,y; z_s, f)$ as a combination of sinusoidal basis functions. However, it is noted that the component $p_u(x,y; z_s, f)$ and the measurement vector $m^P(x,y; z_s, f)$ may be represented as a combination of other types of basis functions, in accordance with other implementations of various techniques described herein.

If the sinusoids in Equation 6 were not subject to the ghosting operators, then a matching pursuit technique could be used to identify the parameters of the sinusoids. The matching pursuit technique is generally described in S. Mallat and Z. Zhang Mallat "Matching pursuits with time-frequency dictionaries" IEEE Transactions on Signal Processing, vol. 41, no. 12, pp. 3397-3415 (1993). The matching pursuit algorithm may be regarded as an iterative algorithm, which expands a particular signal in terms of a linear combination of basis functions. As described herein, the matching pursuit algorithm is generalized to the cases where the signal is represented as a linear combination of basis functions that are subject to some linear transformation, e.g., the deghosting operation. This generalized technique described herein is referred to as the GMP algorithm.

FIG. 3 illustrates a flow diagram of a method 300 for using a GMP technique in accordance with implementations of various techniques described herein. The method 300 may be used for purposes of determining the coefficients of Equations 4 and 6. In this regard, the method 300 includes, pursuant to block 310, selecting a new basis function, applying the ghosting operator $H(k_x,k_y; z_s,f)$ to the new basis function and adding the transformed basis function to an existing measurement function to form a new measurement function. After the first basis function (which may be in the simplest form a single sinusoidal function or even a constant) is added, a new exponential is added at each iteration to the set of basis functions used, and the corresponding "ghosted" basis function is added to the representation; and then, an error, or residual, is determined based on the actual seismic data that are acquired by the sensor measurements, pursuant to block 320.

The residual energy is then minimized for purposes of determining the A parameters for the new basis function. More specifically, a determination is made (block 330) whether the residual energy has been minimized with the current parameters for the new basis function. If not, the parameters are adjusted and the residual energy is again determined, pursuant to block 320. Thus, a loop is formed for purposes of minimizing some metric of the residual energy until a minimum value is determined, which permits the coefficients for the next basis function to be determined. Therefore, pursuant to diamond 350, if another basis function is to be added (based on a predetermined limit of basis functions, for example), the method 300 continues with block 310 to add the next basis function and calculate the corresponding parameters. Otherwise, if no more basis functions are to be added, the upgoing component of the seismic event is determined, pursuant to block 360.

As a more specific example, the $A_j$ parameters for the newest basis function may be determined by minimizing the energy of the residual. Therefore, if P−1 basis functions have been determined previously, the representation of the component $p_u(x,y; z_s, f)$ with the P−1 sinusoids may be as follows:

$$p_u(x, y; z_s, f) = \sum_{j=1}^{P-1} A_j e^{j2\pi(k_{x,j}x + k_{y,j}y - k_{z,j}z_s)} \quad \text{Equation 9}$$

The corresponding measurement function for the P−1 basis functions may be obtained by applying the ghost operators to the basis functions:

$$m^P(x, y; z_s, f) = \sum_{j=1}^{P} A_j H(k_{x,j}, k_{y,j}; z_s, f) e^{j2\pi(k_{x,j}x + k_{y,j}y + k_{z,j}z_s)} \quad \text{Equation 10}$$

The residual in the approximation, called "$r^{P-1}(x,y; z_s,f)$" may be defined as follows:

$$r^{P-1}(x, y; z_S, f) = m(x, y; z_S, f) - \sum_{j=1}^{P-1} A_j H(k_{x,j}, k_{y,j}; z_S, f) e^{j2\pi(k_{x,j}x + k_{y,j}y + k_{z,j}z_S)}$$

Equation 11

If a new basis function "$\overline{A}_P e^{j2\pi(\overline{k}_{x,P}x + \overline{k}_{y,P}y + \overline{k}_{z,P}z_S)}$," which has a) corresponding coefficient called "$\overline{A}_P$" is added to the existing representation of the upgoing wavefield, then the residual may be rewritten as follows:

$$r^P_{(\overline{A}_P,\overline{k}_{x,P},\overline{k}_{y,P})}(x,y;z_s,f) = r^{P-1}(x,y;z_s,f) - \overline{A}_P H(\overline{k}_{x,P}, \overline{k}_{y,P}; z_s, f) e^{j2\pi(\overline{k}_{x,P}x + \overline{k}_{y,P}y + \overline{k}_{z,P}z_s)}$$

Equation 11

It is noted that for Equation 9, the parameters $\overline{A}_P$, $\overline{k}_{x,P}$, $\overline{k}_{y,P}$ for the new basis function term are determined. In one implementation, the new basis function term may be solved along a single spatial direction, where a subset of the parameters $\overline{A}_P$, $\overline{k}_{x,P}$, $\overline{k}_{y,P}$ may be determined. For example, the new basis function term may be solved along the y-direction, such that the parameters $\hat{A}_P$ and $\overline{k}_{y,P}$ of the new basis function are determined.

As a specific example, the parameters of the new basis function may be found by minimizing some metric of the residual, which is calculated over inline and crossline sensor locations, as described below:

$$(\overline{k}_{x,P}, \overline{k}_{y,P}, \overline{A}_P) = \arg \min_{(\overline{A}_P, \overline{k}_{x,P}, \overline{k}_{y,P})} M(\overline{A}_P, \overline{k}_{x,P}, \overline{k}_{y,P}; z_s, f)$$

Equation 12

One such example metric may be described as follows:

$$M(\overline{A}_P, \overline{k}_{x,P}, \overline{k}_{y,P}; z_s, f) = \sum_{m=n} \left(r^P_{\overline{A}_P, \overline{k}_{x,P}, \overline{k}_{y,P}}(x, y; z_s, f)\right)^H C^{-1} r^P_{\overline{A}_P, \overline{k}_{x,P}, \overline{k}_{y,P}}(x, y; z_s, f)$$

Equation 13 where "C" represents a four by four positive definite matrix; "$x_m$" represents the sensor locations in the inline direction; and "$y_n$" represents the sensor locations in the crossline direction.

In some implementations, a method for seismic data processing is provided. The method may receive seismic data for a region of interest. The seismic data may be acquired in a seismic survey. The method may receive a summation that is based on a particle motion velocity component of a seismic wavefield in the vertical direction and the pressure component of the seismic wavefield. The method may predict an upgoing pressure component of the seismic wavefield for the region of interest. The method may compare the predicted upgoing pressure component to the received seismic data that corresponds to the received summation. The method may update the predicted upgoing pressure component based on the comparison. The method may use the updated upgoing pressure component in hydrocarbon exploration or production for the region of interest.

The method may further include comparing the predicted upgoing pressure component to the received seismic data that corresponds to the particle motion velocity component of the seismic wavefield in the cross-line direction, and wherein updating the predicted upgoing pressure component is based at least in part on the comparison to the received seismic data that corresponds to the particle motion velocity component of the seismic wavefield. The updating the predicted upgoing pressure component may be performed by constructing an upgoing pressure component as a linear combination of a plurality of basis functions that approximately match the received seismic data. The predicted upgoing pressure component may be a basis function, and the updating the predicted upgoing pressure component may include updating the basis function based at least in part on the comparison. The received seismic data may include pressure data, particle motion data in the vertical direction and particle motion data in the crossline direction. The received summation may include a weight for the particle motion velocity component of the seismic wavefield in the vertical direction and a weight for the pressure component of the seismic wavefield, and the weights for the particle motion velocity component or the pressure component may designate the relevance of the received seismic data corresponding to the velocity component or the pressure component in the comparison. The sum of the weights may be unity. At least one of the weights may be based at least in part on a signal to noise ratio corresponding to the received seismic data. The comparing the predicted upgoing pressure component to the received seismic data that corresponds to the received summation may include the following: determining derived data based at least in part on the received summation and one or more parameters of the predicted upgoing pressure component; and determining a residual between the derived data and measurements from the received seismic data corresponding to the received summation. The determining the derived data may include applying one or more ghost operators to the predicted upgoing pressure component to produce the derived data. The one or more parameters of the predicted upgoing pressure component may be selected from the group consisting of: amplitude; phase; frequency; wavenumber in the crossline direction; wavenumber in the inline direction; and wavenumber in the vertical direction. The updating the predicted upgoing pressure component may include the following: determining whether the residual has satisfied a predetermined criterion; and when the predetermined criterion is unsatisfied, updating the one or more parameters of the predicted upgoing pressure component. The predetermined criterion may be whether the residual has converged approximately to a minimum.

In some implementations, an information processing apparatus for use in a computing system is provided, and includes means for receiving seismic data for a region of interest. The seismic data may be acquired in a seismic survey. The information processing apparatus may also have means for receiving a summation based on a particle motion velocity component of a seismic wavefield in the vertical direction and the pressure component of the seismic wavefield. The information processing apparatus may also have means for predicting an upgoing pressure component of the seismic wavefield for the region of interest. The information processing apparatus may also have means for comparing the predicted upgoing pressure component to the received seismic data that corresponds to the received summation. The information processing apparatus may also have means for updating the predicted upgoing pressure component based on the comparison. The information processing apparatus may also have means for using the updated upgoing pressure component in hydrocarbon exploration or production for the region of interest.

In some implementations, a computing system is provided that includes at least one processor, at least one memory, and one or more programs stored in the at least one memory, wherein the programs include instructions, which when executed by the at least one processor cause the computing system to receive seismic data for a region of interest. The seismic data may be acquired in a seismic survey. The programs may further include instructions to cause the computing system to receive a summation that is based on a particle motion velocity component of a seismic wavefield in the vertical direction and the pressure component of the seismic wavefield. The programs may further include instructions to cause the computing system to predict an upgoing pressure component of the seismic wavefield for the region of interest. The programs may further include instructions to cause the computing system to compare the predicted upgoing pressure component to the received seismic data that corresponds to the received summation. The programs may further include instructions to cause the computing system to update the predicted upgoing pressure component based on the comparison. The programs may further include instructions to cause the computing system to use the updated upgoing pressure component in hydrocarbon exploration or production for the region of interest.

In some implementations, a computer readable storage medium is provided which has stored therein one or more programs, the one or more programs including instructions, which when executed by a processor, cause the processor to receive seismic data for a region of interest. The seismic data may be acquired in a seismic survey. The programs may further include instructions, which cause the processor to receive a summation that is based on a particle motion velocity component of a seismic wavefield in the vertical direction and the pressure component of the seismic wavefield. The programs may further include instructions, which cause the processor to predict an upgoing pressure component of the seismic wavefield for the region of interest. The programs may further include instructions, which cause the processor to compare the predicted upgoing pressure component to the received seismic data that corresponds to the received summation. The programs may further include instructions, which cause the processor to update the predicted upgoing pressure component based on the comparison. The programs may further include instructions, which cause the processor to use the updated upgoing pressure component in hydrocarbon exploration or production for the region of interest.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 4:
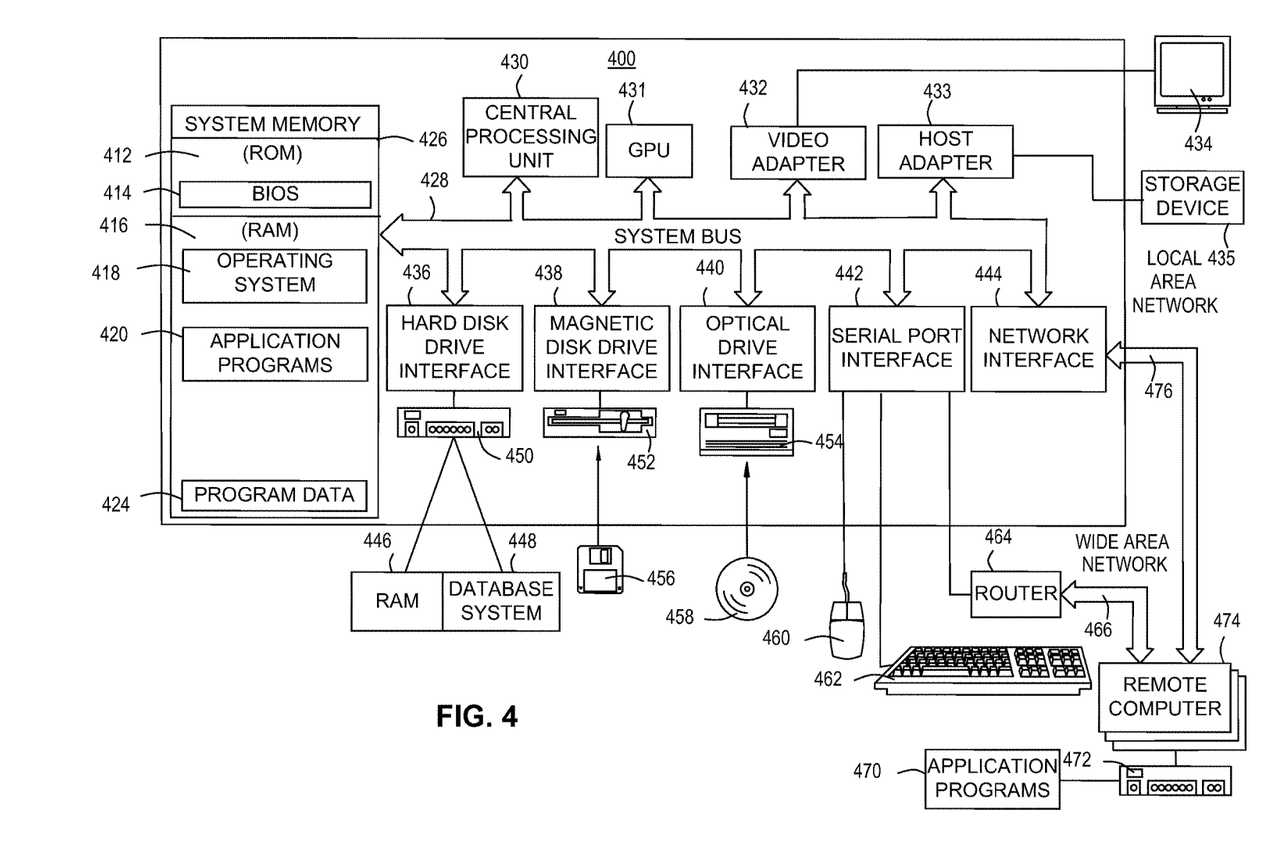
FIG. 4 illustrates a computing system in which the various technologies and techniques described herein may be incorporated and practiced.

FIG. 4 illustrates a schematic diagram of a computing system 400 in which the various technologies described herein may be incorporated and practiced. Although the computing system 400 may be a conventional desktop or a server computer, as described above, other computer system configurations may be used.

The computing system 400 may include a central processing unit (CPU) 430, a system memory 426, a graphics processing unit (GPU) 431 and a system bus 428 that couples various system components including the system memory 426 to the CPU 430. Although one CPU is illustrated in FIG. 4, it should be understood that in some implementations the computing system 400 may include more than one CPU. The GPU 431 may be a microprocessor specifically designed to manipulate and implement computer graphics. The CPU 430 may offload work to the GPU 431. The GPU 431 may have its own graphics memory, and/or may have access to a portion of the system memory 426. As with the CPU 430, the GPU 431 may include one or more processing units, and the processing units may include one or more cores. The system bus 428 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 426 may include a read-only memory (ROM) 412 and a random access memory (RAM) 416. A basic input/output system (BIOS) 414, containing the basic routines that help transfer information between elements within the computing system 400, such as during start-up, may be stored in the ROM 412.

The computing system 400 may further include a hard disk drive 450 for reading from and writing to a hard disk, a magnetic disk drive 452 for reading from and writing to a removable magnetic disk 456, and an optical disk drive 454 for reading from and writing to a removable optical disk 458, such as a CD ROM or other optical media. The hard disk drive 450, the magnetic disk drive 452, and the optical disk drive 454 may be connected to the system bus 424 by a hard disk drive interface 436, a magnetic disk drive interface 438, and an optical drive interface 440, respectively. The drives and their associated computer-readable media may provide nonvolatile storage of computer-readable instructions, data structures, program modules and other data for the computing system 400.

Although the computing system 400 is described herein as having a hard disk, a removable magnetic disk 456 and a removable optical disk 458, it should be appreciated by those skilled in the art that the computing system 400 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 400 may also include a host adapter 433 that connects to a storage device 435 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 450, magnetic disk 456, optical disk 458, ROM 412 or RAM 416, including an operating system 418, one or more application programs 420, program data 424, and a database system 448. The application programs 420 may include various mobile applications ("apps") and other applications configured to perform various methods and techniques described herein. The operating system 418 may be any suitable operating system that may control the operation of a networked personal or server computer, such as Windows® XP, Mac OS® X, Unix-variants (e.g., Linux® and BSD®), and the like.

A user may enter commands and information into the computing system 400 through input devices such as a keyboard 462 and pointing device 460. Other input devices may include a microphone, joystick, game pad, satellite dish, scanner, or the like. These and other input devices may be connected to the CPU 430 through a serial port interface 442 coupled to system bus 428, but may be connected by other interfaces, such as a parallel port, game port or a universal serial bus (USB). A monitor 438 or other type of display device may also be connected to system bus 428 via an interface, such as a video adapter 432. In addition to the monitor 438, the computing system 400 may further include other peripheral output devices such as speakers and printers.

Further, the computing system 400 may operate in a networked environment using logical connections to one or more remote computers 474. The logical connections may be any connection that is commonplace in offices, enterprise-wide computer networks, intranets, and the Internet, such as local area network (LAN) 476 and a wide area network (WAN) 466. The remote computers 474 may be another a computer, a server computer, a router, a network PC, a peer device or other common network node, and may include many of the elements describes above relative to the computing system 400. The remote computers 474 may also each include application programs 470 similar to that of the computer action function.

When using a LAN networking environment, the computing system 400 may be connected to the local network 476 through a network interface or adapter 444. When used in a WAN networking environment, the computing system 400 may include a router 464, wireless router or other means for establishing communication over a wide area network 466, such as the Internet. The router 464, which may be internal or external, may be connected to the system bus 428 via the serial port interface 442. In a networked environment, program modules depicted relative to the computing system 400, or portions thereof, may be stored in a remote memory storage device 435. It will be appreciated that the network connections shown are merely examples and other means of establishing a communications link between the computers may be used.

The network interface 444 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 474.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method for seismic data processing, comprising:
    receiving seismic data for a region of interest, wherein the seismic data comprises a seismic wavefield and was acquired during a seismic survey;
    calculating a summation based at least in part on a particle motion velocity component of the seismic wavefield in a vertical direction and a pressure component of the seismic wavefield, wherein the summation comprises a weight for the particle motion velocity component and a weight for the pressure component;
    predicting an upgoing pressure component of the seismic wavefield for the region of interest based at least in part on a model of an upgoing pressure component of the seismic wavefield;
    determining a measurement vector based in part on the weights of the summation and the seismic wavefield;
    determining a ghosting operator for the measurement vector;
    determining an upgoing pressure component based at least in part on the measurement vector and the ghosting operator;
    comparing the predicted upgoing pressure component to the calculated summation;
    updating the model based at least in part on the comparison, wherein updating the model comprises constructing the predicted upgoing pressure component as a linear combination of a plurality of basis functions that approximately match the received seismic data; and
    generating a seismic image of the region of interest based in part on the model to provide imaging of the region of interest for identifying subterranean geological formations.

2. The method of claim 1, further comprising comparing the predicted upgoing pressure component to the received seismic data that corresponds to the particle motion velocity component of the seismic wavefield in a crossline direction, wherein updating model is based at least in part on the comparison to the received seismic data that corresponds to the particle motion velocity component of the seismic wavefield.

3. The method of claim 1, wherein the model comprises a basis function, and wherein updating the model comprises updating the basis function based at least in part on the comparison.

4. The method of claim 1, wherein the received seismic data comprises pressure data, particle motion data in the vertical direction and particle motion data in a crossline direction.

5. The method of claim 1, wherein the weights for the particle motion velocity component or the pressure component designate a relevance of the received seismic data corresponding to the particle motion velocity component or the pressure component in the comparison.

6. The method of claim 5, wherein a sum of the weights is unity.

7. The method of claim 5, wherein at least one of the weights is based at least in part on a signal to noise ratio corresponding to the received seismic data.

8. The method of claim 1, wherein comparing the predicted upgoing pressure component to the upgoing pressure component comprises:
    determining derived data based at least in part on the summation and one or more parameters of the predicted upgoing pressure component; and
    determining a residual between the derived data and measurements from the received seismic data corresponding to the summation.

9. The method of claim 8, wherein the one or more parameters of the predicted upgoing pressure component are selected from the group consisting of:
    amplitude;
    phase;
    frequency;
    wavenumber in a crossline direction;
    wavenumber in an inline direction; and
    wavenumber in a vertical direction.

10. The method of claim 8, wherein updating the model further comprises:
    determining whether the residual has satisfied a predetermined criterion; and
    when the predetermined criterion is unsatisfied, updating the one or more parameters of the predicted upgoing pressure component.

11. The method of claim 10, wherein the predetermined criterion is whether the residual has converged approximately to a minimum.

12. A non-transitory computer-readable medium having stored thereon a plurality of computer-executable instructions which, when executed by a computer, cause the computer to perform operations, the operations comprising:
    receiving seismic data for a region of interest, wherein the seismic data was acquired during a seismic survey;
    calculating a summation, wherein the summation is based at least in part on a particle motion velocity component of a seismic wavefield in a vertical direction and a pressure component of the seismic wavefield, wherein the summation comprises a weight for the particle motion velocity component and a weight for the pressure component;
    predicting an upgoing pressure component of the seismic wavefield for the region of interest based at least in part on a model of an upgoing pressure component of the seismic wavefield;
    determining a measurement vector based in part on the weights of the summation and the seismic wavefield;
    determining a ghosting operator for the measurement vector;

determining an upgoing pressure component based at least in part on the measurement vector and the ghosting operator;

comparing the predicted upgoing pressure component to the calculated summation;

updating the model based at least in part on the comparison, wherein updating the model comprises constructing the upgoing pressure component as a linear combination of a plurality of basis functions, wherein the basis functions match approximately with the received seismic data; and generating a seismic image of the region of interest based in part on the model to provide imaging of the region of interest for identifying subterranean geological formations.

13. The non-transitory computer-readable medium of claim 12, wherein the weights designate a relevance of the received seismic data corresponding to the particle motion velocity component or the pressure component in the comparison.

14. The non-transitory computer-readable medium of claim 12, wherein comparing the predicted upgoing pressure component to the upgoing pressure component comprises:

determining derived data based at least in part on the summation and one or more parameters of the predicted upgoing pressure component;

determining a residual between the derived data and measurements from the received seismic data corresponding to the summation;

determining that the residual has not satisfied a predetermined criterion; and in response to determining that the predetermined criterion is unsatisfied, updating the one or more parameters of the predicted upgoing pressure component.

15. A computing system, comprising:

one or more processors; and memory having a plurality of executable instructions which, when executed by the one or more processors, cause the one or more processors to perform operations, the operations comprising:

receiving seismic data for a region of interest, wherein the seismic data was acquired during a seismic survey;

calculating a summation, wherein the summation is based at least in part on a particle motion velocity component of a seismic wavefield in a vertical direction and a pressure component of the seismic wavefield, wherein the summation comprises a weight for the particle motion velocity component and a weight for the pressure component;

predicting an upgoing pressure component of the seismic wavefield for the region of interest based at least in part on a model of an upgoing pressure component of the seismic wavefield;

determining a measurement vector based in part on the weights of the summation and the seismic wavefield;

determining a ghosting operator for the measurement vector;

determining an upgoing pressure component based at least in part on the measurement vector and the ghosting operator;

comparing the predicted upgoing pressure component to the calculated summation;

updating the model based at least in part on the comparison, wherein updating the model comprises constructing the upgoing pressure component as a linear combination of a plurality of basis functions, wherein the basis functions match approximately with the received seismic data; and generating a seismic image of the region of interest based in part on the model to provide imaging of the region of interest for identifying subterranean geological formations.

16. The computing system of claim 15, wherein the summation comprises a weight for the particle motion velocity component and a weight for the pressure component, and wherein the weights designate a relevance of the received seismic data corresponding to the pressure component or the velocity component in the comparison.

* * * * *